United States Patent
Wardman et al.

(10) Patent No.: US 11,423,406 B2
(45) Date of Patent: Aug. 23, 2022

(54) MULTI-TIERED APPROACH TO DETECT AND MITIGATE ONLINE ELECTRONIC ATTACKS

(71) Applicant: PAYPAL, INC., San Jose, CA (US)

(72) Inventors: Bradley Wardman, Phoeniz, AZ (US); Sundar Amalan Vincent, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 254 days.

(21) Appl. No.: 16/716,054

(22) Filed: Dec. 16, 2019

(65) Prior Publication Data

US 2021/0182858 A1    Jun. 17, 2021

(51) Int. Cl.
| | | |
|---|---|---|
| *G06Q 20/40* | (2012.01) | |
| *H04L 9/40* | (2022.01) | |
| *G06N 5/04* | (2006.01) | |

(52) U.S. Cl.
CPC .......... *G06Q 20/4016* (2013.01); *G06N 5/04* (2013.01); *H04L 63/1425* (2013.01); *H04L 2463/102* (2013.01)

(58) Field of Classification Search
CPC .......... G06F 21/552; G06F 2221/2133; G06F 21/554; G06N 5/04; H04L 63/1425; H04L 2463/102; G06Q 20/4016
See application file for complete search history.

(56) References Cited

U.S. PATENT DOCUMENTS

| | | | | |
|---|---|---|---|---|
| 2010/0192201 A1* | 7/2010 | Shimoni | ............. | H04L 63/1458 726/3 |
| 2015/0067850 A1* | 3/2015 | Baikalov | ............. | H04L 63/1458 726/23 |
| 2017/0070523 A1* | 3/2017 | Bailey | ................. | H04L 63/0861 |
| 2018/0077179 A1* | 3/2018 | Zhang | ................. | H04L 63/1441 |
| 2020/0099713 A1* | 3/2020 | Rajput | .................. | G06N 5/046 |
| 2020/0110874 A1* | 4/2020 | Shafet | ..................... | G06F 21/55 |

\* cited by examiner

*Primary Examiner* — Scott S Trotter
(74) *Attorney, Agent, or Firm* — Haynes and Boone, LLP (57) ABSTRACT

A triaged approach is implemented to detect and prevent electronic attacks against online entities and to reduce latency. Transaction requests are classified into different tiers and are treated differently based on the tier status. For example, transaction requests to conduct transactions with an entity are received from a client system. Characteristics such as rate or amounts of transactions of the transaction requests are analyzed. The characteristics are compared against specified threshold limits to assess whether the specified threshold limits are exceeded. Based on an assessment that at least one of the specified threshold limits is exceeded, a set of computer instructions is selected from different sets of computer instructions for execution on the client system. A result of an execution is received from the client system. Based on the result of the execution, a determination is made whether the transaction requests appear to have originated from a machine-automated submission process.

20 Claims, 6 Drawing Sheets

MULTI-TIERED APPROACH TO DETECT AND MITIGATE ONLINE ELECTRONIC ATTACKS

BACKGROUND

Technical Field

The present disclosure generally relates to computer security, and more particularly, to detecting and mitigating potential electronic attacks on networked computer systems.

Related Art

Rapid advances have been made in the past several decades in the fields of computer technology and telecommunications. These advances have led to more and more transactions being conducted online, which has attracted the attention of malicious actors. Criminals leverage data sets acquired from computer security breaches to validate or use stolen information (e.g., carding attacks) against online entities that can waste computing resources and require costly remediation, and thus Applicant recognizes that it is important to detect these electronic attacks so that preventative or remedial measures can be taken. However, if strict detection and mitigation measures are implemented for all electronic transactions, it may increase transaction latency beyond a reasonable limit and/or result in inefficient use of computer resources. What is needed is a more practical and efficient multi-tiered approach to examine the electronic transactions.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic activities become increasingly more prevalent. For example, more and more people are using the Internet to perform various daily tasks such as banking, buying goods/services, consuming media, paying bills, etc. However, the popularity of online transactions has also led to an increasing number of attacks focused on online entities, such as online merchants. For example, an actor with malicious intent—such as a carder (e.g., traffickers of credit cards, bank accounts, or other user personal information online)—may engage in nefarious activities to discover and/or exploit one or more vulnerabilities of a particular online merchant (e.g., a bug, a weakness, a weakness in the payment method itself, or a security loophole in the merchant's website).

In some cases, the carders may have a legitimate credit card number of a victim but lack the 3-digit or 4-digit CVV2 (Card Verification Value) number of the credit card. Therefore, the carders may continually check the same active credit card number against a merchant by testing different CVV2 codes until a successful match has been found. In some other cases, the carders may iterate a specific BIN number (e.g., the first six digits of a credit card number) of a credit card issuer to map out as many credit card numbers as possible. In yet other cases, the carders may have already illegally obtained a large list of credit card numbers (e.g., from hacking an online database) and may want to determine which of these credit card numbers are still valid. Therefore, the carders may test the list by engaging in transactions with small monetary amounts (e.g., a penny for each transaction) to identify valid credit card numbers that can be further exploited. In each of these cases discussed above, the carders often utilize a machine-automated submission process (e.g., via a script or program that emulates a legitimate web browser) to quickly conduct their tests.

Some online shopping websites may lack security controls to prevent such automated carding attacks, and these websites may thus be targeted by malicious actors. For example, a small online merchant who normally takes 10 or 20 credit card payments a day might have their volume increased to hundreds or thousands of attempted credit card payments during an attack in which a carder is using the merchant's site.

To prevent or mitigate carding attacks, prospective transactions can be inspected to determine whether they appear to be legitimate. However, if the strictest inspection measures are implemented for all prospective transactions, it may result in latency that is greater than acceptable (e.g., transaction processing is too slow). Extremely strict inspections may frustrate legitimate consumers by increasing transaction friction (e.g. requiring additional questions to provide proof that the user is legitimate). Furthermore, extremely strict transaction inspection may also lead to inefficient use of electronic resources, since the inspection of legitimate transactions necessarily consumes electronic resources, which may be wasted if the transactions turn out to be legitimate. Conventional fraud identification and/or prevention systems have not devised a satisfactory solution to address these problems.

The present disclosure is directed to a multi-tiered approach to detect and mitigate electronic attacks (e.g., carding attacks) against online entities. According to the multi-tiered approach, the electronic transactions are triaged into different tiers based on their characteristics, in various embodiments. Electronic transactions in a certain tier are examined at a deeper level because their characteristics indicate that they may be fraudulent, while electronic transactions in other tiers may be examined at a more superficial level or not at all, because their characteristics indicate that they are likely legitimate transactions.

In particular, transactions may come from a merchant in unusual volumes (e.g. an order of magnitude or more of increase in requests) or come from a merchant in unusual amounts (e.g. currency amounts that deviate significantly from previous transaction patterns). When transactions exhibit predefined patterns that correspond to the unusual volumes or monetary amounts, this may indicate that transactions from a particular merchant or website need additional scrutiny before being processed and sent to a credit card network. Thus, according to one embodiment, a plurality of transaction requests is received from a transmitting client system. The transaction requests include requests to conduct transactions with an entity such as a merchant. The transaction requests each have a respective identifier that corresponds to an account usable to complete the respective transaction request. As non-limiting examples, this identifier may include a credit or debit card number.

One or more characteristics of the plurality of transaction requests are then analyzed, according to various embodiments. The one or more characteristics may include a rate at which the transaction requests are received at a processing system, for example a number of transaction requests received on a daily basis, an hourly basis, or a minutely basis. The one or more characteristics may also include an amount of each of the transaction requests, for example a monetary value corresponding to each of the transaction request.

The one or more characteristics are then compared against one or more specified threshold limits to assess whether the one or more specified threshold limits are exceeded. For example, if an entity has an average transaction rate of 5 transactions per day and is now experiencing a sudden spike in the transaction rate (e.g., a transaction rate of greater than 1000 per day), this may be an indicator that the entity is undergoing an electronic carding attack. As another example, if an entity has an average monetary value of $20 per transaction, and is now seeing that the average monetary value of the transaction is below 50 cents for a predetermined amount of time, this sudden drop in transaction amount (or in other words, a sudden increase in a greater number of very small transactions) may also be an indicator that the entity is undergoing an electronic carding attack. Many different metrics may be used in determining if a specified threshold limit is being violated (e.g. if small "test" transactions are of concern, then a percentage of overall transactions under $5 or some other limit could be measured for a particular merchant).

The specified threshold limits (e.g., the number of transactions per day or the amount involved in the transaction) may be custom tailored for each entity and may be flexibly adjusted. For example, the predefined threshold limits may be calculated based on historical transaction data for the entity, and such calculations may be done at predefined periods in time, e.g., the threshold may be lower at certain times of the day or week than at other times, such as due to historical higher legitimate transaction requests occurring during a merchant's operating hours, a merchant sale, a shopping day or period (Black Friday, Christmas, Mother's Day, etc.), and the like.

In some embodiments, the Internet Protocol (IP) address of the client system or a device identifier (e.g., a Media Access Protocol (MAC) address) of the client system may also be analyzed. The IP address may be compared with one or more historical IP addresses of the client system, and/or the device identifier may be compared with one or more historical device identifiers of the client system.

Based on an assessment that at least a particular one of the one or more specified threshold limits is exceeded, a remedial action may be instigated. For example, a set of computer instructions can be selected from different sets of computer instructions for execution on the client system. The selecting of the set of computer instructions is also based on the particular specified threshold limit that is exceeded, according to some embodiments. For example, if the rate of the transactions exceeds a specified threshold limit, a first set of computer instructions may be selected for execution, but if the monetary amount involved in the transaction exceeds a specified threshold limit, a second set of computer instructions (e.g., different from the first set) may be selected for execution. As another example, if the rate of the transactions exceeds a first specified threshold limit (e.g., more than 50 transactions a day), a first set of computer instructions may be selected for execution, but if the rate of the transactions exceeds a second specified threshold limit (e.g., more than 200 transactions a day), a second set of computer instructions (different from the first set) may be selected for execution. In some embodiments, the selecting of the computer instructions may include causing the client system to download, from a website of the entity, a JavaScript program as the set of computer instructions for execution.

A result of an execution of the set of computer instructions is then received from the client system, according to various embodiments. Based on the result of the execution of the set of computer instructions, a determination may then be made whether the plurality of transaction requests appear to have originated from a machine-automated submission process. For example, the machine-automated submission process may include a scripted program that emulates an actual browser, or it may include a headless browser (e.g., PhantomJS). Note that the machine-automated submission process may be initiated/operated by a human, but the submission of the transaction request itself is performed by a machine, for example by an automated script.

In response to a determination that the transaction requests appear to have originated from the machine-automated submission process, one or more actions are performed to mitigate a risk of processing the transaction requests, according to various embodiments. For example, a Completely Automated Public Turing test to tell Computers and Humans Apart (CAPTCHA) may be applied. As another example, the transaction requests may be denied, temporarily suspended, or a limit may be placed on a monetary amount of the transaction requests or on a number of transaction requests that can be processed for the entity within a predefined period of time.

In some embodiments, the transaction requests are received from a purported browser (e.g., a program that claims to be a certain version of CHROME™) of the client system, and the result of the execution of the set of computer instructions indicates whether the transaction requests are received from the purported browser of the client system. For example, an execution of the set of computer instructions prompts the purported browser to perform one or more operations that are natively supported by the purported browser, such as basic arithmetic (e.g., what is 3 plus 2? or return all font sets within your browser). The result of the execution can indicate whether the one or more operations have been correctly performed, for example, whether the purported browser is able to correctly answer a basic arithmetic question. If the purported browser is unable to provide the correct answer, it may indicate that the transaction requests are received from a machine-automated submission process that is emulating the purported browser.

In some embodiments, the transaction requests are processed in response to a determination that the transaction requests appear to have not originated from the machine-automated submission process. If one or more transactions appear that they may have originated from a machine-automated submission process, however, one or more remedial actions may be taken. These remedial actions may include, as non-limiting examples, temporarily suspending the transactions, lowering the limit on the maximum number of transactions that can be conducted by a given merchant for a predefined time period, excluding transactions having monetary amounts that are above a first predefined threshold or below a second predefined threshold, applying a CAPTCHA to the entity that originated the transactions, etc . . . .

As summarized above and discussed in more detail below, the present disclosure is integrally tied to specific technology environments (e.g., online electronic transaction processing). The present disclosure also improves the functionality of computer systems at least in part via the implementation and execution of a computer instructions (e.g., JavaScript) to easily and effectively detect potential fraud and save use of computing resources, such as processing power and memory usage. The various aspects of the present disclosure will be discussed below in more detail with reference to FIGS. 1-6.

Figure 1:
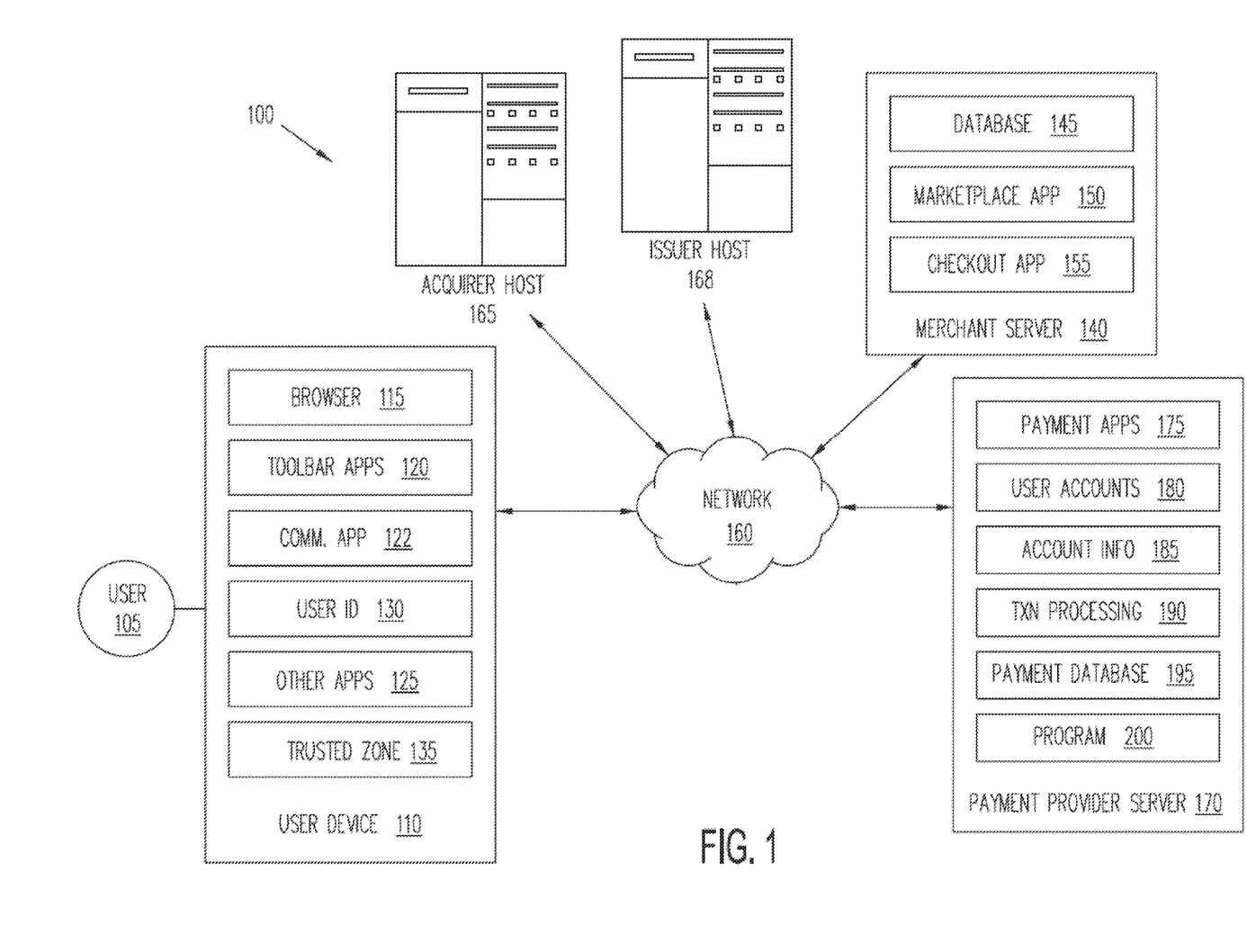
FIG. 1 is a simplified block diagram of a networked system according to various aspects of the present disclosure.

FIG. 1 is a block diagram of a networked system suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, and an issuer host 168 that are in communication with one another over a network 160. Payment provider server 170 may be maintained by a payment service provider, such as PAYPAL™, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, and issuer host 168 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPAD™ from APPLE™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants and individuals. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may also include a program 200. The program 200 is configured to perform the multi-tiered approach discussed above to prevent and/or mitigate electronic carding attacks. For example, the program 200 is configured to receive requests to process online transactions. The requests may be originated by a purported consumer to conduct transactions with merchants such as the merchant server 140. For example, the transaction requests may each include an identifier that corresponds to a financial account for funding the transactions associated with the transaction request. In some embodiments, the identifier may include a credit card number or a debit card number. The merchants may forward the transaction requests to the payment provider server 170 for processing. The program 200 may analyze the transaction requests to determine whether any anomalies exist, which may indicate the possibility of an electronic attack.

As a part of an electronic attack, a perpetrator of the electronic attack (also referred to as a carder) may test a large number of compromised credit cards for a small transaction amount (e.g., 1 cent). The electronic attack could also involve a carder testing a card number with a number of CVV2s to try to find the right number, or where the carder attempts to run through a BIN number range to find all credit card numbers for a BIN. The electronic attacks may also include a credential stuffing attack, for example an attack involving an automated injection of compromised username/password pairs in order to fraudulently gain access to user accounts.

These electronic attacks may exhibit certain characteristics that can be detected by the program 200, for example transaction rate or volume, transaction monetary amount, Internet Protocol (IP) addresses, or device identifiers (IDs). As one example, if a merchant averages 5 transactions per day (or on a specific day, e.g., sale, Tuesday, etc.), but is now receiving 1000 transactions on a given day (or on that specific date, e.g., equivalent or similar sale, Tuesday, etc.), such a disparity in transaction rate or volume is an indication that the merchant may be undergoing an electronic attack. As another example, if a merchant averages $100 worth of revenue per day (or on a specific day, e.g., sale, Sunday, day before Christmas, etc.), but is now receiving transactions that amount to $5000 on a given day (or on that specific date, e.g., equivalent or similar sale, Sunday, day before Christmas, etc.), such a disparity in the monetary amount of transactions is also an indication that the merchant may be undergoing an electronic attack. As a further example, if the merchant receives a plurality of transactions that all share a common BIN (e.g., 414734) of a credit card, that is also an indication that the merchant may be undergoing an electronic attack. As yet another example, if the merchant receives a plurality of transactions that all share the same credit card number but with different CVV2 codes, that is also an indication that the merchant may be undergoing an electronic attack. As another example, if the merchant receives a plurality of transactions that each have its own credit card number, but the transaction amounts are all small (e.g., a few pennies each), that is also an indication that the merchant may be undergoing an electronic attack. Other indications of electronic attack may include a detection of certain IP addresses or device IDs, since these the IP addresses or device IDs from which the transactions originate are associated with a known carder or hacker. Similarly, a generic authority or industry consortium may create and/or provide a list of cards (e.g., with certain card numbers) that are prohibited from certain ecosystems (e.g., a payment ecosystem). If a card on such a list is detected, it may be an indication of an electronic attack. The program 200 may specify that transactions that exhibit patterns (e.g., with respect to transaction volume, rate, monetary amount, repeating BINs, certain IP addresses or device IDs etc.) that correspond to those discussed above may be considered transactions that need a higher level of scrutiny than transactions that do not exhibit these patterns.

The program 200 is configured to detect these anomalies discussed above. If the prospective transactions do not exhibit any of these anomalies, the program 200 may classify the prospective transactions as first tier transactions that are deemed safe, meaning that the merchant is unlikely to be experiencing an electronic attack such as a carding attack. The payment provider server 170 may then process these prospective transactions with little or no additional inspection. However, if the prospective transactions exhibit one or more of these anomalies discussed above, the program 200 may classify the prospective transactions as second tier transactions that are deemed unsafe, meaning that the merchant is likely to be experiencing an electronic attack such as a carding attack. In that case, the program 200 may apply an increased level of scrutiny to these transactions and/or undertake one or more other measures to prevent or mitigate the electronic attack.

For example, the program 200 may include different sets of JavaScript instructions that can be "pushed" to, or downloaded by, other devices or systems such as the merchant server 140 or the user device 110. In some embodiments, an execution of the JavaScript instructions may prompt the device of the purported consumer to perform one or more tasks and receive the result accordingly. In one example scenario, a transaction request may indicate that the prospective transactions are originated using a certain version of a certain type of web browser running on the device of the purported consumer. As the purported consumer is checking out, the JavaScript instructions may be automatically downloaded (e.g., in response to a click of a "checkout" button on the website of the merchant) and executed.

The execution of the JavaScript instructions may prompt the browser to perform operations that should be natively supported by the browser, for example basic arithmetic (e.g., what is 3 times 6?) or solving a simple puzzle. If the transaction requests indeed originated from the purported browser version and type, the browser should have been able to return a correct result. However, carders often carry out their electronic attacks using machine-automated submission processes, for example using a scripted program that emulates the purported browser, or by a headless browser (e.g., PhantomJS) that could be used to automate web page interactions. Therefore, if the purported browser cannot correctly perform the specified operations according to the execution of the JavaScript instructions, that may be an indication that the purported consumer could be a carder.

An indication that the transaction requests may have originated from a machine-automated submission process may warrant further investigation into the transaction requests. For example, the program 200 may throw a Completely Automated Public Turing test to tell Computers and Humans Apart (CAPTCHA) at the device of the purported consumer. If a carder had been using a machine-automated submission process to originate the transaction requests, the machine-automated submission process will likely fail the CAPTCHA.

In response to a CAPTCHA failure, the program 200 may temporarily suspend the transaction requests, deny the transaction requests, place a monetary or total volume limit on the transaction requests, and/or ask a human agent to perform additional investigations with the purported consumer (e.g., a telephone call to verify the identity information and/or authentication information of the purported consumer). On the other hand, if the purported consumer had been a legitimate consumer who had used a machine-automated submission process because he/she is privacy conscious, that privacy-conscious consumer would still be able to pass the CAPTCHA, in which case the program 200 may approve the transaction requests. The program 200 may also send warnings to the merchant, the acquirer host 165, and/or the issuer host 168 regarding the possibility that the merchant is under an electronic attack, so that these entities may prepare for such attacks, and/or take steps to correct the vulnerabilities that make the merchant prone to such attacks.

Although the program 200 is shown in FIG. 1 as a separate program, it is understood that it (or one or more of its functionalities) may be integrated in other components of FIG. 1. For example, in some embodiments, the program 200 (or a similar tool) may be implemented on the merchant server, on a computer of the acquirer host 165, or on a computer the issuer host 168 as well. In other embodiments, the program 200 may be divided in parts, with some parts being implemented on the payment provider server 170, while other parts are implemented on the merchant server 140 and/or the acquirer host 165 or issuer host 168. Furthermore, although the program 200 is illustrated as being separate from the transaction processing application 190 in the embodiment shown in FIG. 1, the transaction processing application 190 may implement some, or all, of the functionalities of the program 200 in other embodiments. In other words, the program 200 may be integrated within the transaction processing application 190 in some embodiments. The features and functionalities of the program 200 will be discussed later in more detail with reference to FIGS. 2-6.

Still referring to FIG. 1, a payment network ay be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. The payment network interfaces with the acquirer host 165, the issuer host 168, and/or the payment provider 170 server to facilitate transactions, according to various embodiments. For example, the payment provider server 170 may forward a transaction request to the payment network. The payment network may assess the transaction and may then send it to the acquirer host 165 or the issuer host 168 as a part of processing the transaction request. However, in some situations, a payment processor (e.g., the entity operating the payment provider server 170) may be penalized by the payment network if the payment processor sends an excess number of transactions that could have been determined by the payment processor to be fraudulent. As such, the payment processor may need to carefully screen the transactions in order to avoid the penalties. Since screening transactions may increase transaction latency, the payment processor is configured to screen some transactions with more scrutiny and other transactions with less scrutiny, according to some embodiments of the present disclosure. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
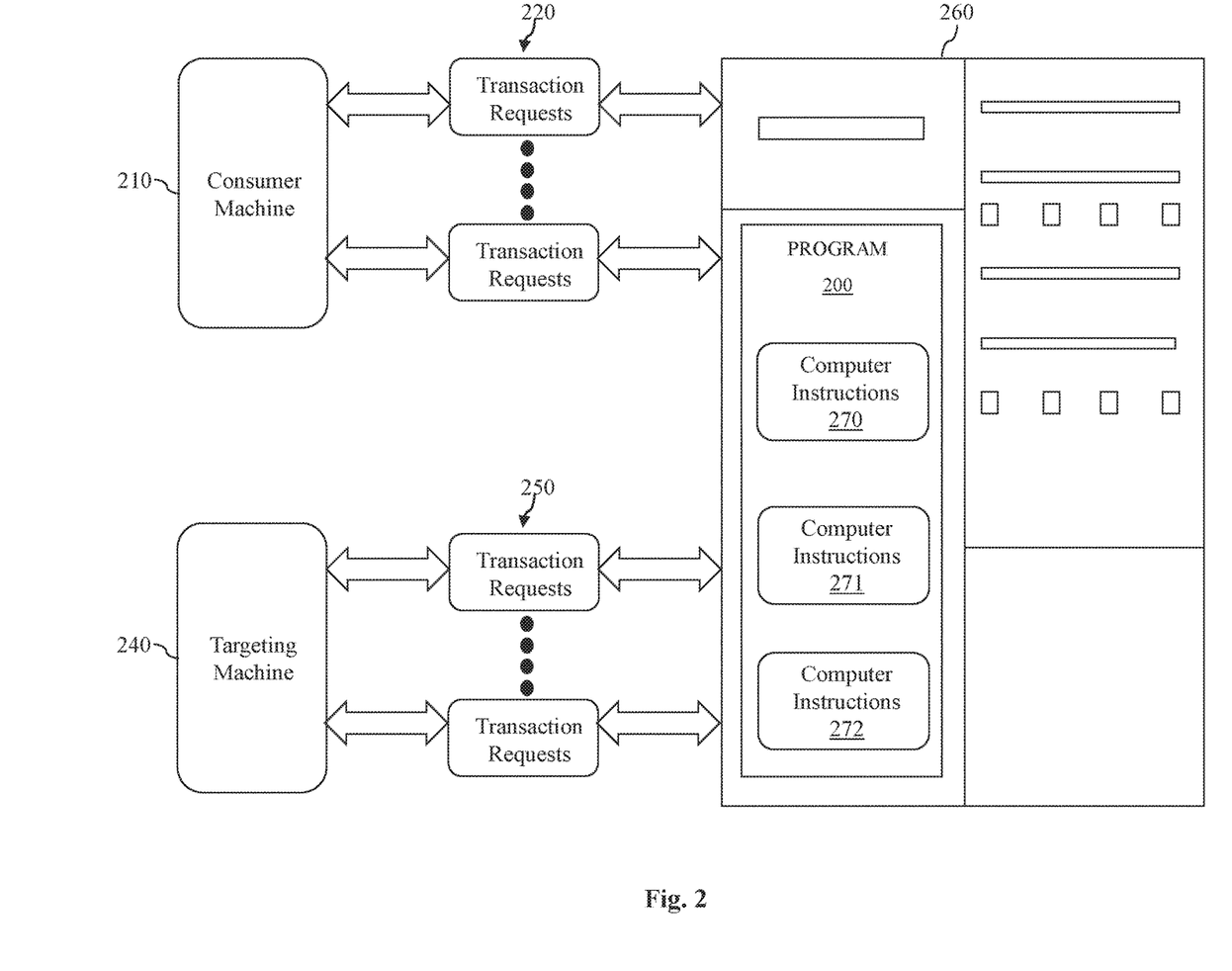
FIG. 2 is a block diagram that illustrates interactions between various entities according to various aspects of the present disclosure.

FIG. 2 is a simplified block diagram illustrating the interactions between various entities according to aspects of the present disclosure. The block diagram in FIG. 2 includes a consumer machine 210. The consumer machine 210 may be a machine of a consumer, for example a desktop computer, a laptop computer, a mobile telephone, or a tablet computer. In some embodiments, the consumer machine 210 may include the user device 110 of FIG. 1. The consumer may use the consumer machine 210 to generate a plurality of transaction requests, for example transaction requests 220, to conduct transactions with an external entity such as a merchant (e.g., via the merchant server 140 discussed above). Since the consumer machine 210 belongs to a real consumer, the transactions requests 220 may be considered legitimate transaction requests.

The block diagram in FIG. 2 also includes a targeting machine 240, which may also include a desktop computer, a laptop computer, a mobile telephone, or a tablet computer. The targeting machine 240 is used by a malicious actor to perpetrate electronic attacks against online entities, according to various embodiments, such as carding attacks and/or credential stuffing attacks. In that regard, a malicious actor may be a single entity or may include a plurality of entities that either act individually or act at least in part in unison, to perpetrate fraud against online entities. There may be multiple such targeting machines (as well as multiple consumer machines).

In some examples, the malicious actor may include a carder who buys, sells, and/or trades online credit card data stolen from phishing websites or from large data breaches at retail stores. As discussed above, the carding attacks occur when the carders check the same credit/debit card number with different CVV2 numbers until a correct CVV2 number is found, or when the carders iterate a specific BIN number, or when the carders check a list of credit/debit card numbers with small transaction amounts to see which ones are still active. A similar attack is credential stuffing whereby an adversary carries out a cyber-attack where stolen account credentials such as usernames/email addresses and the corresponding passwords (often from a data breach) are used to gain unauthorized access to user accounts through large-scale automated login requests directed against a web application.

Carders may use a machine-automated submission process to perpetrate the carding and credential stuffing attacks. For example, a virtual machine with an emulated browser may be used to automate the web page interactions (e.g., at a login or checkout page), and a Python or other script may be used to automate the login attempts for a large number of previously discovered credential pairs. The carding and/or credential stuffing attacks are problems that specifically arise in a computer networking context and did not exist prior to the advent and popularization of computer and electronic networking technologies. For example, implementing such a large-scale attack with thousands (or more) of credit/debit card numbers or authentication credentials would not have been possible using pen and paper alone or in a human's mind, as such an attack requires sending information over electronic networks, and in some cases, virtual machines or other automation tools.

In order to perpetrate the attacks, the targeting machine 240 may be running one or more virtual machines, which may include programs that emulate a legitimate user device, for example the consumer machine 210. The virtual machine may include specialized software, hardware, or a combination thereof, to provide at least some of the functionalities of the actual physical device that is emulated. In this manner, the targeting machine 240 can pretend to be one or more legitimate users who would like to engage in legitimate transactions with other online entities such as merchants. For example, the targeting machine 240 may generate transaction requests 250 to conduct transactions with an entity, such as a merchant (via the merchant server 140 discussed above). These transaction requests 250 are fraudulent in this embodiment since they correspond to the carding and/or credential stuffing attacks.

The legitimate transaction requests 220 and the fraudulent transaction requests 250 are received by a machine 260 for further analysis. In some embodiments, the machine 260 may include the payment provider server 170 discussed above. In other embodiments, the machine 260 may include the merchant server 140 discussed above. In yet other embodiments, the machine 260 may include at least portions of both the payment provider server 170 and the merchant server 140. The transaction requests 220 and 250 each include a respective identifier that corresponds to an account that is usable to complete the respective transaction request. For example, the identifier may be a credit card number, a debit card number, or an account number of a financial account for funding the transaction associated with the transaction request. Identifiers may also include tokenized payment information, e.g., a payment token including a credit card or other funding instrument that has been tokenized, In the case of the fraudulent transaction requests, the identifier may include the stolen credit/debit card numbers (which may lack the CVV2), or the BIN that corresponds to a portion of a series of legitimate credit/debit card numbers.

The program 200 discussed above may be installed on the machine 260. The program 200 may analyze the characteristics of transaction requests 220 and 250 to determine which of these requests are likely legitimate and which of these requests are likely fraudulent. As one example, the characteristics of the transaction requests 220 and 250 may include the rate at which the transaction requests 220 and 250 are received. Since the transaction requests 220 are legitimate requests, they are likely received at a rate that is typical based on a previous history. For example, the consumer generating the transaction requests 220 may generate them at an average of about 1 request per day, or about 3 requests per week. On the other hand, since the transaction requests 250 are fraudulent in nature, they are likely received at an "abnormal" rate, for example a much faster rate than the average rate at which the transaction requests 220 are received. In example carding or credential stuffing attacks, the targeting machine 240 may be generate hundreds, if not thousands, of requests per day, or even per hour or minute.

To determine what transaction rate may be considered typical, the program 200 may specify a threshold limit on the transaction rate based on historical transaction data. In some embodiments, the threshold limit may be specified for a specific individual consumer based on that consumer's prior transactions (e.g., how many transactions did that consumer conduct per day for the past year?). In other embodiments, the threshold limit may be specified for a group of consumers, or for consumers in a certain consumer segment or group. For example, the program 200 may determine that, among other things:

individual consumers in the United States average about 1 transaction per day per individual consumer;
individual consumers in Mexico average about 3 transactions per week per individual consumer;
business consumers in the United States average about 10 transactions per day per business consumer;
business consumers in Mexico average about 3 transactions per day per business consumer.

It is understood the above list is merely an example provided for illustration and is not exhaustive, and that the metrics may be determined for a variety of other consumer types and geographical regions. In any case, the threshold limits may be calculated based on various metrics including averages. For example, the threshold limit may be calculated as one standard deviation (or multiple standard deviations) above the average. In some embodiments, the threshold limit may also be defined as a maximum historical transaction rate (e.g., how many transactions did a consumer generate at most during any given day or any given hour in the past year?).

The threshold limits may also be custom tailored to a merchant (or another entity that is engaged in the prospective transaction with a consumer). For example, if a merchant has been averaging 100 transactions per day for the past year, a transaction rate threshold limit may be calculated based on the average of 100 transactions (e.g., one or more standard deviations above the average of 100 transactions). As another example, if a merchant has been engaged in transactions having amounts ranging between about $5 and about $1000 for the past year, then a lower monetary threshold limit may be calculated based on $5 (e.g., one or more standard deviations below $5), and an upper monetary threshold limit may be calculated based on $1000 (e.g., one or more standard deviations above $1000). As yet another example, a specific BIN (the first X number of digits in a credit card or a debit card) may have appeared Y number of times in all the transactions conducted by a merchant in the past year (e.g., the BIN of 549012 may have appeared 100 times in the past year, and no more than 5 times consecutively). Therefore, the frequency occurrence of a specific BIN may also be used to calculate a threshold limit for repeating BINs.

Regardless of how the threshold limit is specified for the transaction rate, once it is specified, the program 200 may compare it against the transaction rates associated with the transaction requests 220 and 250. For the transaction requests 220, the transaction rate will not exceed the specified threshold limit for the transaction rate. As such, the transaction requests 220 may be classified as first tier transactions, which are deemed legitimate and need no more inspections. In other words, the transaction requests 220 may be approved without requiring further analysis. In contrast, the transaction rate of the transaction requests 250 is very likely to exceed the specified threshold limit for the transaction rate. As such, the transaction requests 250 may be classified as second tier transactions, which are deemed potentially fraudulent and warrant further inspections.

It is understood that transaction rate is not the only characteristic of the transaction requests 220 and 250 that can be analyzed. In other embodiments, a monetary amount involved in the transaction requests may also be a characteristic that can be analyzed. For example, based on historical transaction data, the program 200 may determine that transactions originated by legitimate consumers on average are within a range between about $5 and about $2000. Therefore, the program 200 may specify a lower threshold limit of $5 (or a number that is calculated as a function of $5) and an upper threshold limit of $2000 (or a number that is calculated as a function of $2000). If any of the transaction requests 220 and 250 are associated with monetary amounts that are greater than the lower threshold limit and less than the upper threshold limit, the program 200 may determine that such a transaction request is a first tier transaction that may be safely processed. But if any of the transaction requests 220 and 250 are associated with monetary amounts that are below the lower threshold limit or greater than the upper threshold limit, the program 200 may determine that such a transaction request is a second tier transaction that may warrant further investigation. Of course, larger or smaller currency amounts may also be used in various embodiments as a threshold.

Another characteristic that can be analyzed is an identifier of the machine that originated the transaction requests. In some embodiments, the identifier may be an Internet Protocol (IP) address of the machine 210 or the machine 240. If a malicious actor is using the machine 240 to impersonate an account of a legitimate consumer whose account credentials have been stolen, the IP address of the targeting machine 240 may not match the historical IP address of the actual machine of the victim consumer. Such an inconsistency between the IP addresses may trigger a further investigation. Similarly, a Media Access Protocol (MAC) address may also be a characteristic that can be analyzed and compared with historical data to spot inconsistencies.

In some embodiments, the further inspections may involve selecting a set of computer instructions for execution on the machine that generated the transaction requests 250 (e.g., the targeting machine 240). For example, the program 200 may include a plurality of sets of computer instructions, such as computer instructions 270-272, that can be downloaded and executed on the targeting machine 240.

In some embodiments, the computer instructions 270-272 may include Javascript or other automated code that prompts the purported browser running on the targeting machine 240 to perform a task. The task may correspond to functionalities that are natively supported by the purported browser. For example, if the targeting machine 240 is reporting to the program 200 that it is using version X of INTERNET EXPLORER™ as its web browser to generate the transaction requests 250, the JavaScript code may ask the purported browser to solve a basic arithmetic problem such as "what is 5+3"?", since basic addition or subtraction are functionalities that are natively supported by version X of INTERNET EXPLORER™.

As another example, the computer instructions 270-272 may include JavaScript code that prompt the purported browser running on the targeting machine 240 to solve a puzzle, such as a Sudoku puzzle. The capability of solving specific types of puzzles may also be natively supported by browsers of certain types and/or certain versions.

As yet another example, the computer instructions 270-272 may include instructions designed to cause execution of a CAPTCHA, for example a CAPTCHA as described in more detail in U.S. Pat. No. 9,710,643 entitled "Interactive CAPTCHA", the disclosure of which is hereby incorporated by reference in its entirety.

Other examples of the sets of computer instructions are described in more detail in U.S. Pat. No. 9,866,582 entitled "Detection of Scripted Activity" and U.S. Pat. No. 9,490,987 entitled "Accurately Classifying a Computer Program Interacting with a Computer System Using Questioning and Fingerprinting", the disclosures of each of which are hereby incorporated by reference in their respective entireties. For example, U.S. Pat. Nos. 9,866,582 and 9,490,987 each describes various fingerprinting techniques to detect and classify automated scripts that may have been used by malicious actors to perpetrate cyber-attacks. For example, the fingerprinting techniques may involve issuing challenges to test the capability of a client application, which may help determine the type of the client application (e.g., whether the client application is a legitimate web browser or imitating a web browser). These challenges may be considered embodiments of the computer instructions discussed above.

The sets of computer instructions 270-272 may be different from each other, and the program 200 may select different sets of computer instructions 270-272 under different conditions. For example, if the transaction rate of the received transaction requests exceeds a first threshold limit (e.g., one standard deviation above the historical average), then the program 200 may select the computer instructions 270 for downloading and execution by the targeting machine 240. But if the transaction rate of the received transaction requests exceeds a second threshold limit (e.g., three standard deviations above the historical average), then the program 200 may select the computer instructions 271 for downloading and execution by the targeting machine 240. The computer instructions 271 may be more resource-intensive and/or may require more time to complete its execution than the computer instructions 270. Therefore, in order to minimize latency and to avoid disrupting the shopping experience of legitimate users (to the extent possible), the computer instructions 270 may be applied as a "first line of defense" in some embodiments, since it causes the least amount of latency increase. Since the first threshold limit is lower than the second threshold limit, it is still possible that first threshold limit may have been triggered by legitimate transactions, and thus the less-intrusive computer instructions 270 may be selected for execution in response thereto. However, the triggering of the second threshold limit may indicate a greater likelihood that fraud is involved, and therefore the more resource-intensive computer instructions 271 may be selected for execution in response thereto, as the transaction now poses a greater fraud risk.

As another example, if the transaction requests 250 claim that they are being generated via a browser of a first type and/or a first version, the computer instructions 270 may be selected for execution, since the computer instructions 270 may be configured to specifically prompt the browsers of the first type and/or the first version to perform a first task (e.g., to perform a basic arithmetic operation such as addition, subtraction, multiplication, or division). However, if the transaction requests 250 claim that they are being generated via a browser of a second type and/or a second version, the computer instructions 271 may be selected for execution, since the computer instructions 271 may be configured to specifically prompt the browsers of the first type and/or the first version to perform a second task (e.g., to solve a Sudoku puzzle).

Regardless of which set of computer instructions 270-272 is executed by the targeting machine, if the targeting machine 240 is unable to return a correct result to the program 200, a red flag is raised, since the inability to provide the correct result reflects an inconsistency between what the targeting machine 240 "claims to be" versus what the targeting machine 240 actually is. Often times, the incorrect result is caused by browser spoofing or some other machine-automated submission process in which the transaction requests 250 are generated not by real humans but by machines or virtual machines.

It is understood, however, that a failure to return the correct result in response to the execution of the computer instructions 270-272 is not definitive proof that fraud is involved. In some cases, a privacy-conscious and technically-savvy consumer may also employ machine-automated submission processes to generate transaction requests in an effort to maintain anonymity. Therefore, additional measures may be taken by the program 200 to further investigate the identity of the targeting machine 240. This may be referred to as a step-up authentication.

For example, the program 200 may send instructions to human agents or machine modules involved in fraud prevention to contact the targeting machine 240, for example to prompt the entity asking the targeting machine to provide additional user authentication credentials that have not been entered yet. As another example, the program 200 may ask the targeting machine to solve one or more additional CAPTCHAs (if a CAPTCHA has not been applied already). It is also understood that the use of the step-up authentication mechanisms may be leveraged by card issuers, which may invoke them appropriately in the flow for suspected transactions to further refine the card authentication process. In some embodiments, actions may also be taken to mitigate the risk of processing the transaction requests. For example, the program 200 may at least temporarily deny or suspend one or more of the transaction requests 250, or it may place a limit on the monetary amount of one or more of the transaction requests 250 (e.g., no transaction requests can be processed if it is larger than $10,000, or less than 5 pennies), or it may place a limit on the total number of transaction requests 250 that can be processed within a predefined period of time (e.g., no more than 5 transaction requests per hour). Furthermore, the type of error codes from payment processors may be tracked. For example, such error codes may include invalid merchant, invalid transaction, restricted card, CVV failure, etc. Based on the specific type of error codes, different rate limits may be applied, or the transactions requests may be blocked differently.

Figure 3:
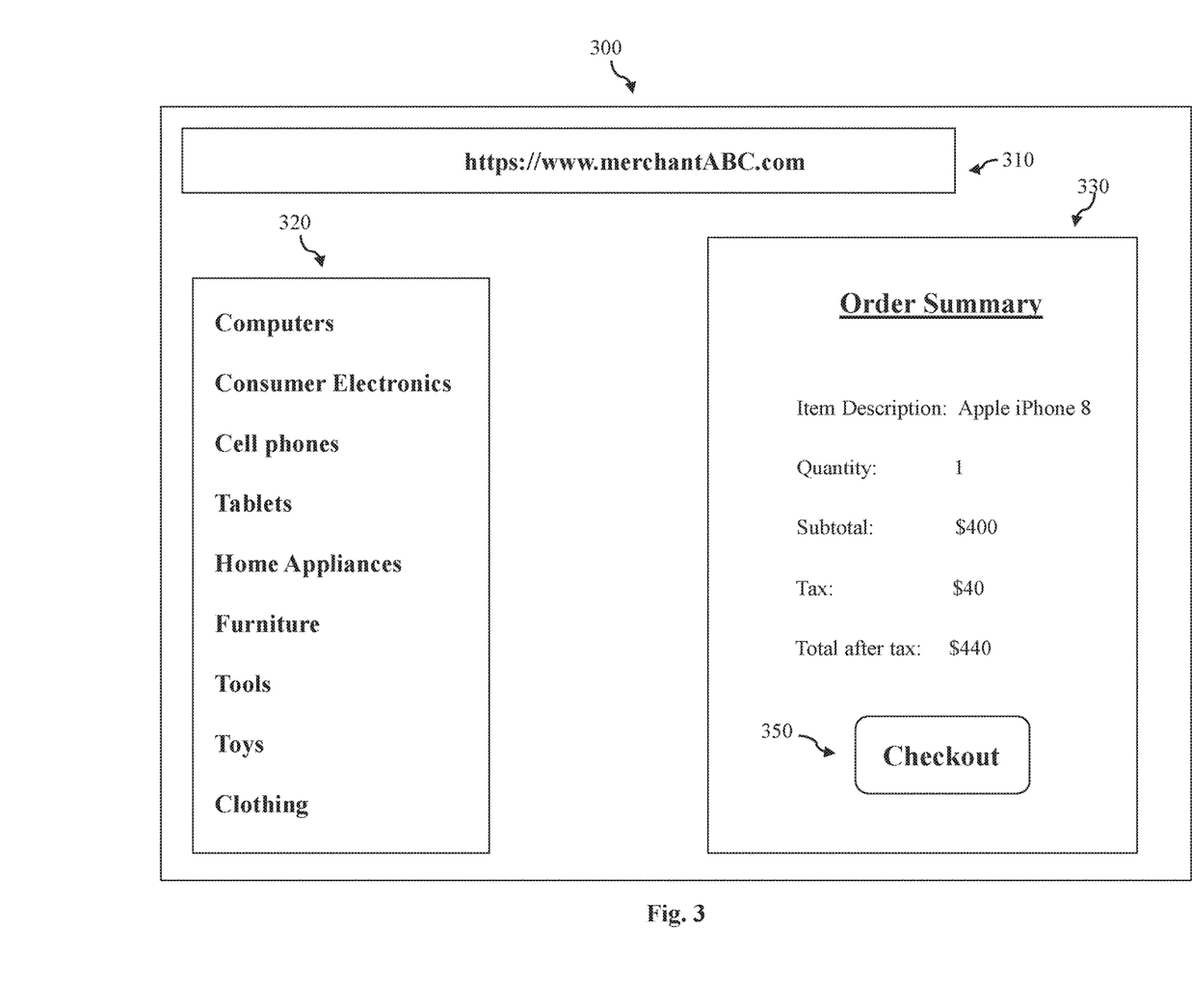
FIG. 3 is an example website of an online entity according to various aspects of the present disclosure.

To provide a simple context in which the computer instructions 270-272 can be downloaded by (or transmitted to) a client device for execution, FIG. 3 illustrates a simplified example screen of a website 300 of an online merchant according to some embodiments. The merchant may be the merchant server 140 of FIG. 1. A user who is shopping on the website 300 may use a software tool such as a web browser (e.g., CHROME™) to browse the website 300. As a part of the web browsing, the merchant server 140 may receive information from the user device that indicates what type of web browser (and/or what version of the browser) is purportedly being used to browse the website 300.

The website 300 may contain a Uniform Resource Locator (URL) 310, which is https://www.merchantABC.com in this example. The website 300 may offer a plurality of categories 320 of goods for sale, such as computers, consumer electronics, cell phones, tablets, home appliances, furniture, tools, toys, and clothing, etc. When the user clicks on each category, products offered in that category are displayed.

The website 300 also displays an order summary 330. The order summary may include the item description (e.g., APPLE IPHONE™ 8), the quantity of the item (1 in this case), the subtotal (e.g., $400), the tax (e.g., $40), and the total after tax (e.g., $440). The website 300 also displays a checkout button 350. When the user clicks on the checkout button 350, in addition to bringing the user to a screen where he/she can checkout, the website 300 sends a set of computer instructions—for example the computer instructions 270-272 discussed above with reference to FIG. 2—to the user device for execution. For example, the computer instructions, when downloaded, may prompt the browser on the user device to perform tasks such as arithmetic calculations or to solve a puzzle, which are functionalities that are natively supported by the web browser. If the user is a legitimate user who was indeed using a standard web browser to browse the website 300 (e.g., consistent with what the version and type of the purported browser), the execution of the computer instructions should return a correct result back to the merchant server 140. When the correct result is received, the merchant server 140 may process the transaction with no additional (or very little) scrutiny.

However, if the user is spoofing a web browser, the execution of the computer instructions should return an incorrect result back to the merchant server 140. When this occurs, further investigation of the transaction may be warranted. For example, the merchant server 140 may apply a CAPTCHA to see if the purported user is actually a human or a machine-automated submission process. Note that the CAPTCHA may also be a part of the computer instructions sent to the user device for execution in some embodiments. If it has been determined that the "user" is a machine-automated submission process, the merchant server 140 may then employ one or more anti-fraud measures or risk-mitigation measures, such as suspending the transaction, using an agent to contact the user for additional user credentials, or placing a limit on the monetary amount or number of transactions that are allowed for the user, or for the merchant. In some embodiments, the anti-fraud measures may include an Extensible Markup Language (XML)-based protocol designed to be an additional layer for online credit card or debit card transactions, where the protocol is based on a three-domain model that includes an acquirer domain, an issuer domain, and an interoperability domain. Messages are sent over cryptographic connections for additional security.

Again, by classifying the prospective transactions into different tiers, the present disclosure can strike an optimum balance between fraud prevention, latency reduction, and/or user experience.

Figure 4:
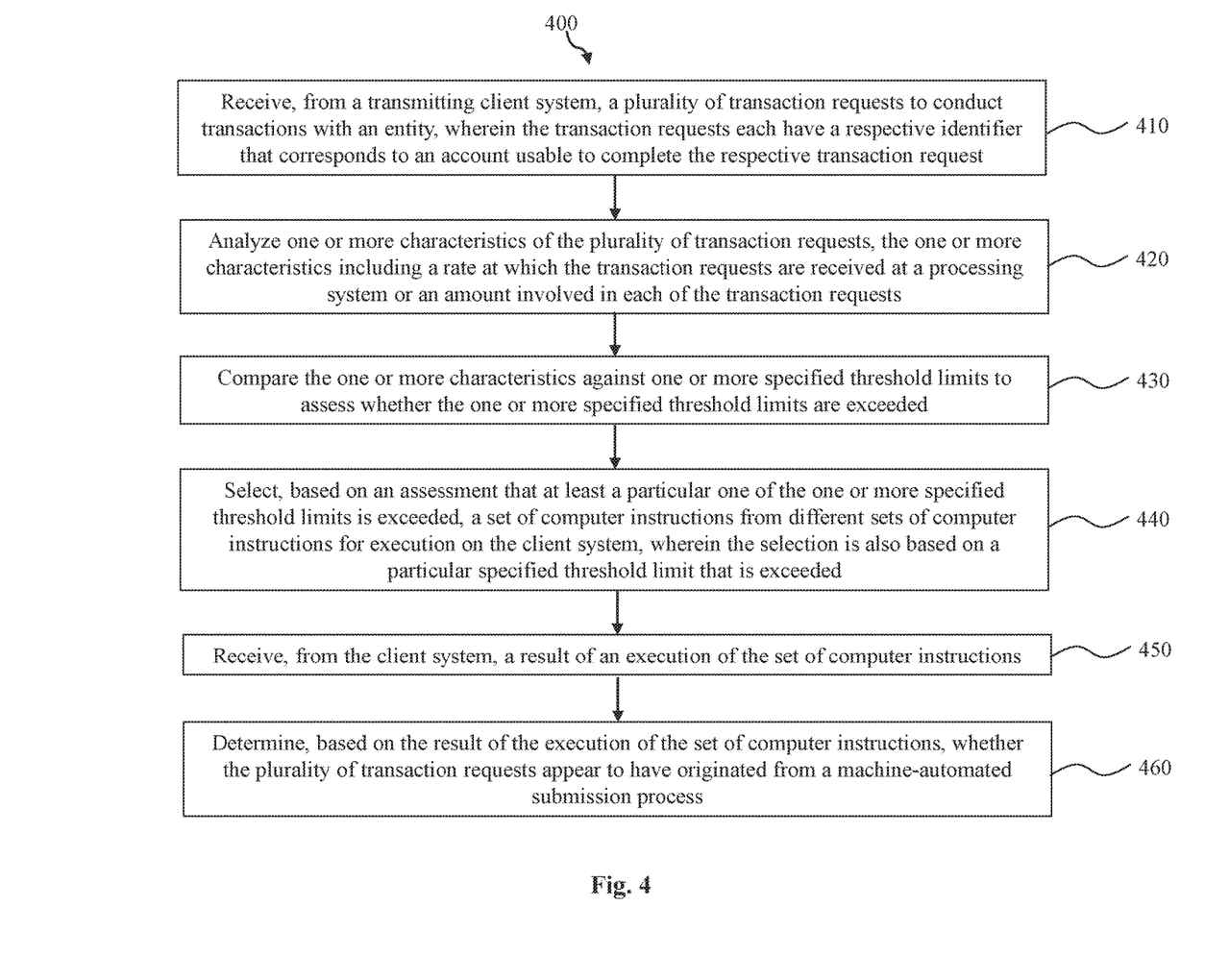
FIG. 4 is a flowchart illustrating a method according to various aspects of the present disclosure.

Referring now to FIG. 4, a flowchart of a method 400 is illustrated. The method 400 describes an example multi-tiered approach to mitigate electronic fraud. It is understood that at least one of the steps of the method 400 is performed using one or more hardware electronic processors. It is also understood that at least one particular system or one particular apparatus/device can execute all of the steps of the method 400, or just a portion of the method 400 (e.g., some of the steps but not the other steps). For example, in some non-limiting embodiments, one or more hardware processors of the payment provider server 170 may execute all of the steps of the method 400 (or a subset of the steps thereof). In some non-limiting embodiments, one or more hardware processors of the merchant server 140 may execute all of the steps of the method 400 (or a subset of the steps thereof).

The method 400 includes a step 410 to receive, from a transmitting client system, a plurality of transaction requests to conduct transactions with an entity. The transaction requests each have a respective identifier that corresponds to an account usable to complete the respective transaction request.

Note that the plurality of transactions indicated in step 410 (and elsewhere) may be also be part of a larger number of transactions. That is, in some embodiments, the operations of method 400 may be applied to only some transactions received in a particular time period from a particular source (or from several sources). While in other embodiments the operations of method 400 may be applied to all transactions received in a particular time period from a particular source.

The method 400 includes a step 420 to analyze one or more characteristics of the plurality of transaction requests. In some embodiments, the one or more characteristics include a rate at which the transaction requests are received at a processing system. In other embodiments, the one or more characteristics include an amount involved in each of the transaction requests. In some embodiments, the step 420 further comprises analyzing an Internet Protocol (IP) address of the client system or a device identifier of the client system.

The method 400 includes a step 430 to compare the one or more characteristics against one or more specified threshold limits to assess whether the one or more specified threshold limits are exceeded. In some embodiments, the step 430 further comprises comparing the IP address with one or more historical IP addresses of the client system or comparing the device identifier with one or more historical device identifiers of the client system.

The method 400 includes a step 440 to select, based on an assessment that at least a particular one of the one or more specified threshold limits is exceeded, a set of computer instructions from different sets of computer instructions for execution on the client system. The selection is also based on a particular specified threshold limit that is exceeded. In some embodiments, the step 440 comprises causing the client system to download, from a website of the entity, a JavaScript program as the set of computer instructions for execution.

The method 400 includes a step 450 to receive, from the client system, a result of an execution of the set of computer instructions.

The method 400 includes a step 460 to determine, based on the result of the execution of the set of computer instructions, whether the plurality of transaction requests appear to have originated from a machine-automated submission process.

In some embodiments, the transaction requests are received from a purported browser of the client system, and the result of the execution of the set of computer instructions indicates whether the transaction requests are received from the purported browser of the client system. In some embodiments, an execution of the set of computer instructions prompts the purported browser to perform one or more operations that are natively supported by the purported browser, and the result of the execution indicates whether the one or more operations have been correctly performed. In some embodiments, the result of the execution of the set of computer instructions indicates that the transaction requests are received from the machine-automated submission process that is emulating the purported browser. In some embodiments, the rate at which the transaction requests are received comprises a number of transaction requests received on a daily basis, an hourly basis, or a minute basis. In some embodiments, the amount involved in each of the transaction requests comprises a monetary value corresponding to each of the transaction requests. In some embodiments, the identifier comprises a credit card number or a debit card number. In some embodiments, the analyzing further comprises analyzing a frequency of occurrence of a BIN number of the credit card number or the debit card number.

It is understood that additional method steps may be performed before, during, or after the steps 410-460 discussed above. For example, the method 400 may include a step of calculating the specified threshold limits based on historical transaction data for the entity. As another example, the method 400 may include a step of: in response to a determination that the transaction requests appear to have originated from the machine-automated submission process, performing one or more actions to mitigate a risk of processing the transaction requests. In some embodiments, the performing the one or more actions comprises applying a Completely Automated Public Turing test to tell Computers and Humans Apart (CAPTCHA). In some embodiments, the performing the one or more actions comprises: denying the transaction requests, temporarily suspending the transaction requests, placing a limit on a monetary amount of the transaction requests, or placing a limit on a number of transaction requests that can be processed for the entity within a predefined period of time. Additional steps are not discussed in detail herein for reasons of simplicity. As another example, the method 400 may further include a step of processing the transaction requests in response to a determination that the transaction requests appear to have not originated from the machine-automated submission process.

Based on the above discussions, it can be seen that the present disclosure offers advantages over conventional fraud detection methods and systems. It is understood, however, that not all advantages are necessarily discussed in detail herein, different embodiments may offer different advantages, and that no particular advantage is required for all embodiments. One advantage is that the present disclosure can prevent fraud. By analyzing the online transaction traffic of merchants, the present disclosure can detect anomalies in the transaction requests' characteristics or patterns, for example with respect to the transaction rate/volume, or monetary amounts involved, or repeating identifiers (e.g., repeating BINs). Transaction requests without such anomalies are classified as one tier and are inspected with little or no additional level of scrutiny, while transaction requests with such anomalies are classified as a different tier and are inspected with additional level of scrutiny. For example, computer instructions are executed on the client device/system, which will then indicate whether the client device/system used a machine-automated submission process to generate the transaction requests. Since machine-automated submission processes are often correlated with fraud or carding attacks, the present disclosure can catch and/or prevent fraud. Another advantage is that the present disclosure can reduce latency. If the increased level of scrutiny is applied to all prospective transactions (e.g., asking all client devices/systems to execute the computer instructions), that would have increased latency to an unacceptable level for many legitimate users as well as merchants. However, since the present disclosure can effective triage the transactions with different risk levels, latency is not increased for legitimate transactions. Thus, potential electronic attacks against online entities may be prevented without wasting electronic resources. The present disclosure thus implements a solution to a problem that specifically arises in a computer networking context (e.g., the electronic attacks discussed above only occurs via computer networks). The server 170 or the server 140 with the program 200 implemented thereon is an improvement over existing computer technologies. Other advantages may include compatibility with existing systems and low cost of implementation.

Figure 5:
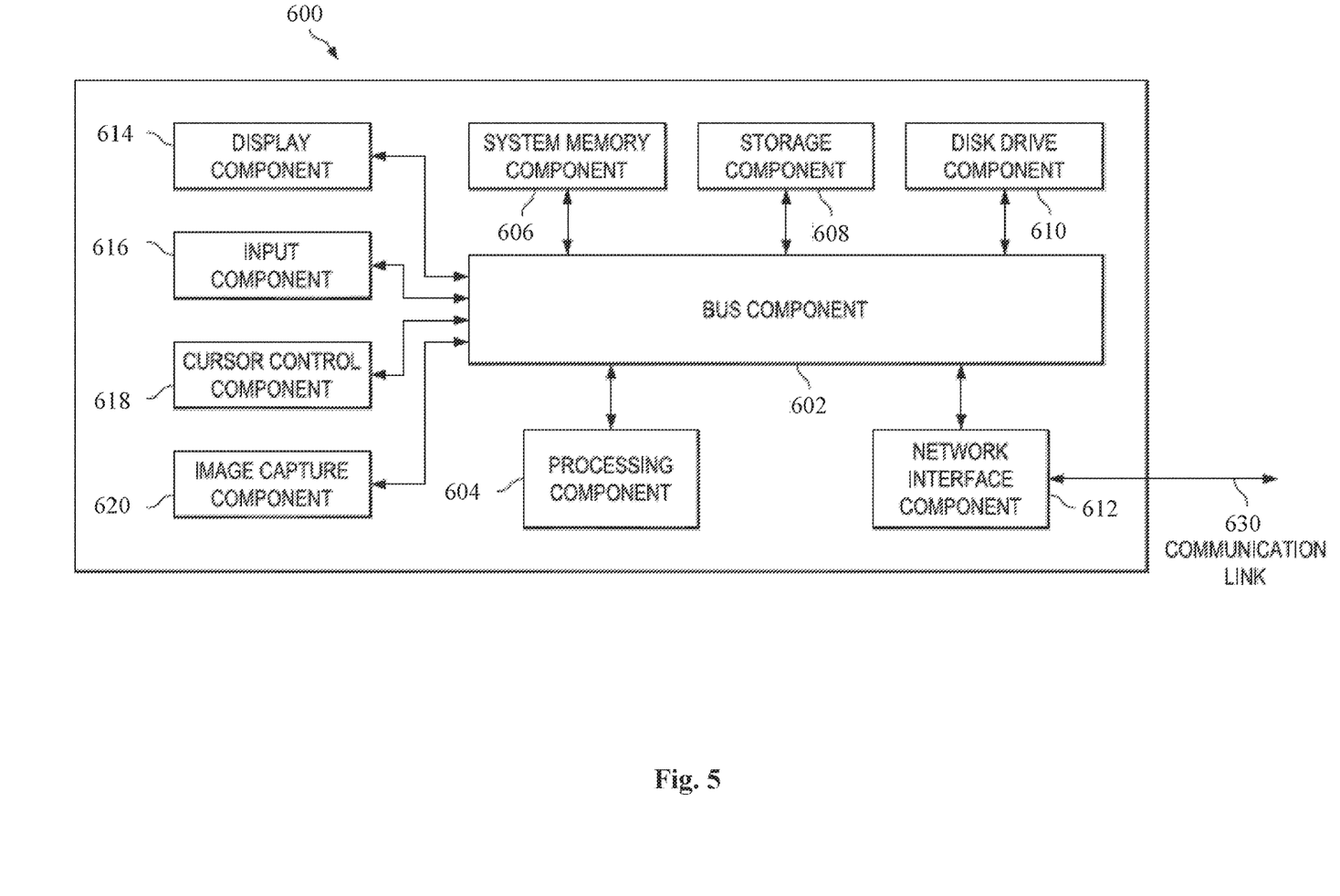
FIG. 5 is an example computer system for implementing the various steps of the methods of FIG. 4 according to various aspects of the present disclosure.

FIG. 5 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6:
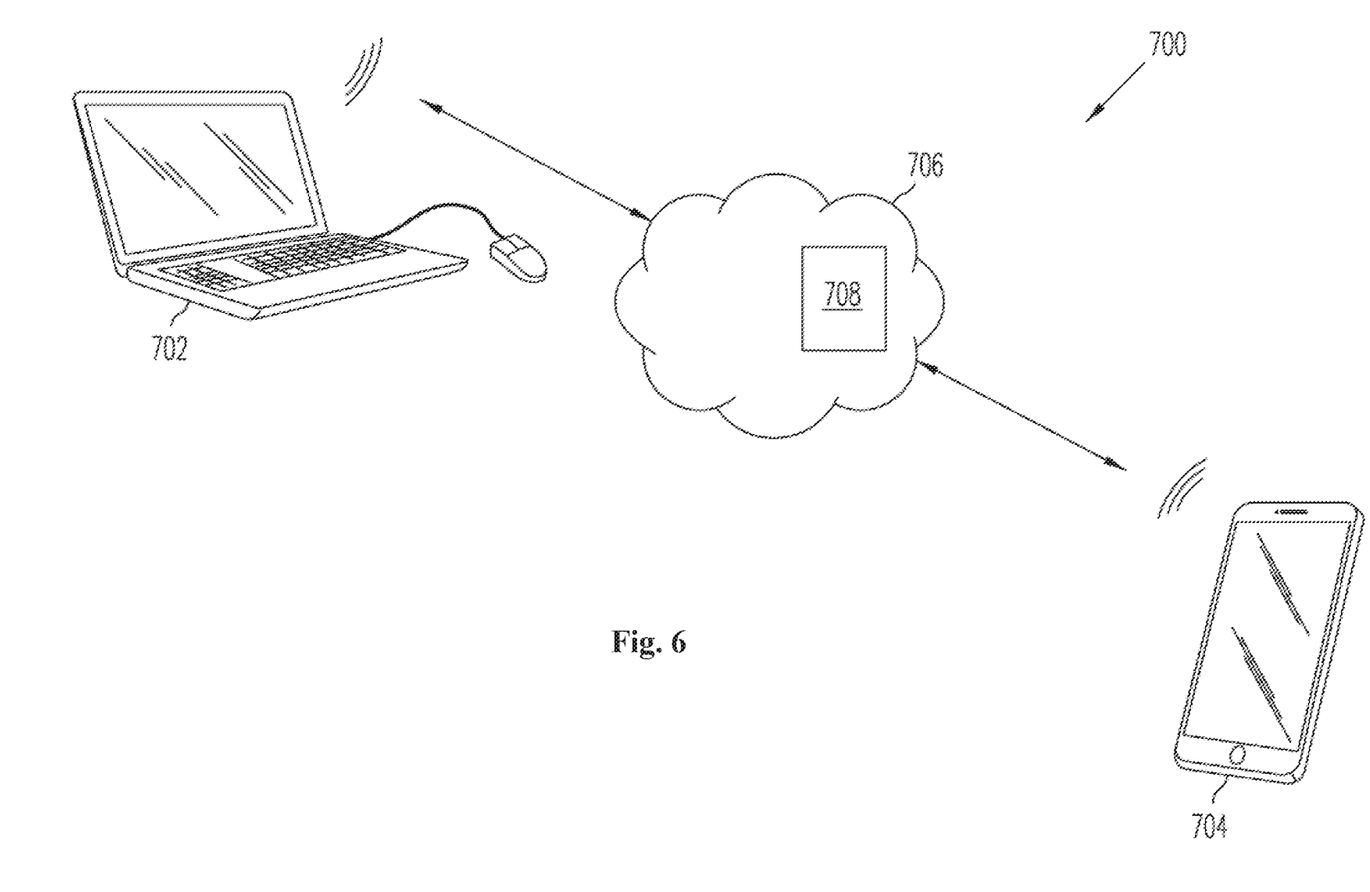
FIG. 6 is a simplified example of a cloud-based computing architecture according to various aspects of the present disclosure.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-5.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. As another example, the mobile device 704 and the cloud-based resources 708 may work together to execute the steps of the method 400 discussed above. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method. The method includes: receiving, from a transmitting client system, a plurality of transaction requests to conduct transactions with an entity, wherein the transaction requests each have a respective identifier that corresponds to an account usable to complete the respective transaction request; analyzing one or more characteristics of the plurality of transaction requests, the one or more characteristics including a rate at which the transaction requests are received at a processing system or an amount involved in each of the transaction requests; comparing the one or more characteristics against one or more specified threshold limits to assess whether the one or more specified threshold limits are exceeded; selecting, based on an assessment that at least a particular one of the one or more specified threshold limits is exceeded, a set of computer instructions from different sets of computer instructions for execution on the client system, wherein the selecting is also based on a particular specified threshold limit that is exceeded; receiving, from the client system, a result of an execution of the set of computer instructions; and determining, based on the result of the execution of the set of computer instructions, whether the plurality of transaction requests appear to have originated from a machine-automated submission process.

Another aspect of the present disclosure involves a system. The system includes a non-transitory memory and one or more hardware processors coupled to the non-transitory memory and configured to read instructions from the non-transitory memory to cause the system to perform operations comprising: analyzing online transaction traffic for an entity, the online transaction traffic being originated by a client system and containing identifiers for completing transactions with the entity; determining, based on the analyzing, that the online transaction traffic exhibits a predefined pattern with respect to a volume of the online transaction traffic, monetary amounts of the transaction traffic, or a frequency of appearance of the identifiers; selecting, based on the determining, one or more sets of computer instructions for downloading (or transmission to) and execution on the client system; accessing a result of an execution of the one or more sets of computer instructions; and evaluating, based on the result of the execution, whether the client system used a machine-automated submission process to originate the online transaction traffic.

Yet another aspect of the present disclosure involves a non-transitory machine-readable medium having stored thereon machine-readable instructions executable to cause a machine to perform operations comprising: receiving, from a web browser of a transmitting client system, a plurality of transaction requests to conduct transactions with an entity, wherein the transaction requests each have a respective identifier that corresponds to an account usable to complete the respective transaction request; determining whether the transaction requests exhibit one or more anomalies, the one or more anomalies comprising: a rate at which the transaction requests is received exceeding a first predefined threshold, a monetary amount of the transaction requests being greater than a second predefined threshold or being less than a third predefined threshold, or a frequency at which one of the identifiers repeats being greater than a fourth predefined threshold; selecting, based on a determination that the transaction requests exhibit the one or more anomalies, a set of computer instructions for execution on the client system, wherein an execution of the set of computer instructions prompts the web browser to complete a task that is natively supported by the web browser; receiving, from the web browser, a result of an execution of the set of computer instructions; evaluating, based on the result of the execution of the set of computer instructions, a likelihood that the transaction requests originated from a machine-automated submission process; and processing the transaction requests with: a first level of scrutiny in response to the evaluating indicating a first likelihood that transaction requests originated from a machine-automated submission process; or a second level of scrutiny in response to the evaluating indicating a second likelihood that transaction requests originated from a machine-automated submission process, wherein the second level of scrutiny is greater than the first level of scrutiny, and wherein the second likelihood is greater than the first likelihood.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving, from a browser-identified software program of a transmitting client system, a plurality of transaction requests to conduct transactions with an entity, wherein the transaction requests each have a respective identifier that corresponds to an account usable to complete the respective transaction request;

analyzing, at a computer system, one or more characteristics of the plurality of transaction requests, the one or more characteristics including a rate at which the transaction requests are received at a processing system or an amount involved in each of the transaction requests;

comparing the one or more characteristics against one or more specified threshold limits;

based on the comparing, assessing whether the one or more specified threshold limits are exceeded;

selecting, based on an assessment that at least a particular one of the one or more specified threshold limits is exceeded and that a particular specified threshold limit is exceeded, a set of computer instructions from different sets of computer instructions for execution on the client system, wherein an execution of the set of computer instructions prompts the browser-identified software program to perform one or more operations that are natively supported by the browser-identified software program;

receiving, from the client system, a result of the execution of the set of computer instructions, wherein the result of the execution of the set of computer instructions indicates whether the one or more operations have been correctly performed; and determining, based on the result of the execution of the set of computer instructions, whether the plurality of transaction requests appear to have originated from a machine-automated submission process.

2. The method of claim 1, wherein:
the rate at which the transaction requests are received comprises a number of transaction requests received within a specified time period; or
the amount involved in each of the transaction requests comprises a monetary value corresponding to each of the transaction requests.

3. The method of claim 1, wherein:
the analyzing further comprises analyzing an Internet Protocol (IP) address of the client system or a device identifier of the client system; and
the comparing further comprises comparing the IP address with one or more historical IP addresses of the client system or comparing the device identifier with one or more historical device identifiers of the client system.

4. The method of claim 1, further comprising: in response to a determination that the transaction requests appear to have originated from the machine-automated submission process, performing one or more actions to mitigate a risk of processing the transaction requests.

5. The method of claim 4, wherein the performing the one or more actions comprises applying a Completely Automated Public Turing test to tell Computers and Humans Apart (CAPTCHA).

6. The method of claim 4, wherein the one or more actions comprises: denying the transaction requests, temporarily suspending the transaction requests, placing a limit on a monetary amount of the transaction requests, or placing a limit on a number of transaction requests that can be processed for the entity within a predefined period of time.

7. The method of claim 1, wherein an execution of the set of computer instructions causes the client system to download, from a website of the entity, a JavaScript program as the set of computer instructions for execution.

8. The method of claim 1, wherein:
the identifier comprises a credit card number or a debit card number; and the analyzing further comprises analyzing a frequency of occurrence of a BIN number of the credit card number or the debit card number.

9. The method of claim 1, further comprising: processing the transaction requests in response to a determination that the transaction requests appear to have not originated from the machine-automated submission process.

10. The method of claim 1, further comprising: calculating the specified threshold limits based on historical transaction data for the entity.

11. The method of claim 1, wherein the one or more operations are natively supported by a predefined type or a predefined version of the browser-identified software program.

12. A system, comprising:
a non-transitory memory; and
one or more hardware processors coupled to the non-transitory memory and configured to read instructions from the non-transitory memory to cause the system to perform operations comprising:
analyzing online transaction traffic for an entity, the online transaction traffic being sent from a software tool of a client system and containing identifiers for completing transactions with the entity;
determining, based on the analyzing, that the online transaction traffic exhibits a predefined pattern with respect to a volume of the online transaction traffic, monetary amounts of the transaction traffic, or a frequency of appearance of the identifiers;
selecting, based on the determining, one or more sets of computer instructions for transmission to and execution on the client system, wherein the one or more sets of computer instructions, when executed, prompt the software tool to perform a task that is natively supported by the software tool;
sending the one or more sets of computer instructions to the client system;
accessing a result of an execution of the one or more sets of computer instructions, the result of the execution indicating whether the task has been correctly performed; and
evaluating, based on the result of the execution, whether the client system used a machine-automated submission process to originate the online transaction traffic.

13. The system of claim 12, wherein the operations further comprise:
facilitating the transactions in response to the evaluating indicating that the client system did not use the machine-automated submission process to originate the online transaction traffic; or
applying additional scrutiny to the online transaction traffic in response to the evaluating indicating that the client system used the machine-automated submission process to originate the online transaction traffic.

14. The system of claim 12, wherein the determining comprises determining, based on historical transaction data associated with the entity, that the volume of the transaction traffic exceeds a predefined limit.

15. The system of claim 12, wherein the determining comprises determining, based on historical transaction data associated with the entity, that the monetary amount of at least some of the transactions is above a predefined first limit or below a predefined second limit.

16. The system of claim 12, wherein:
the identifiers include a plurality of bank identification numbers (BINs); and
the determining comprises determining that at least one of the BINs has been repeated at a frequency that is greater than a predefined frequency.

17. The system of claim 12, wherein:
the task comprises an arithmetic calculation or a solving of a puzzle.

18. The system of claim 12, wherein the software tool is a web browser, and the task is natively supported by a predefined type or a predefined version of the web browser.

19. A non-transitory machine-readable medium having stored thereon machine-readable instructions executable to cause a machine to perform operations comprising:
receiving, from a browser-identified software program of a transmitting client system, a plurality of transaction requests to conduct transactions with an entity, wherein the transaction requests each have a respective identifier that corresponds to an account usable to complete the respective transaction request;
analyzing, at a computer system, one or more characteristics of the plurality of transaction requests, the one or more characteristics including a rate at which the transaction requests are received at a processing system or an amount involved in each of the transaction requests;
comparing the one or more characteristics against one or more specified threshold limits;
based on the comparing, assessing whether the one or more specified threshold limits are exceeded;
selecting, based on an assessment that at least a particular one of the one or more specified threshold limits is exceeded and that a particular specified threshold limit is exceeded, a set of computer instructions from different sets of computer instructions for execution on the client system, wherein an execution of the set of computer instructions prompts the browser-identified software program to perform one or more operations that are natively supported by the browser-identified software program;
receiving, from the client system, a result of the execution of the set of computer instructions, wherein the result of the execution of the set of computer instructions indicates whether the one or more operations have been correctly performed; and
determining, based on the result of the execution of the set of computer instructions, whether the plurality of transaction requests appear to have originated from a machine-automated submission process;
wherein the receiving the plurality of transaction requests, the analyzing, the comparing, the assessing, the selecting, the receiving the result of the execution, or the determining is performed by one or more hardware electronic processors.

20. The non-transitory machine-readable medium of claim 19, wherein the native operations comprise an arithmetic calculation or a solving of a puzzle, and wherein the result of the execution of the set of computer instructions indicates whether the arithmetic calculation has been correctly performed or the puzzle has been correctly solved.

* * * * *